United States Patent
Su et al.

(10) Patent No.: US 9,620,957 B2
(45) Date of Patent: Apr. 11, 2017

(54) ELECTROSTATIC DISCHARGE (ESD) CONTROL CIRCUIT

(71) Applicant: Taiwan Semiconductor Manufacturing Company Limited, Hsin-Chu (TW)

(72) Inventors: Yu-Ti Su, Tainan (TW); Tzu-Heng Chang, New Taipei (TW); Li-Wei Chu, Hsinchu (TW); Yu-Ying Hsu, Pingzhen (TW); Jen-Chou Tseng, Jhudong Township (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 33 days.

(21) Appl. No.: 13/795,426

(22) Filed: Mar. 12, 2013

(65) Prior Publication Data

US 2014/0268439 A1 Sep. 18, 2014

(51) Int. Cl.
*H02H 9/04* (2006.01)

(52) U.S. Cl.
CPC .................................. *H02H 9/046* (2013.01)

(58) Field of Classification Search
CPC .. H01L 27/0266; H01L 27/0281; H02H 9/046
USPC ............................................................ 361/56
See application file for complete search history.

(56) References Cited

U.S. PATENT DOCUMENTS

| 7,049,017 | B2* | 5/2006 | Bai et al. ...................... 429/431 |
| 2008/0007882 | A1* | 1/2008 | Bernard et al. ................. 361/56 |
| 2013/0163131 | A1* | 6/2013 | Gist et al. ....................... 361/56 |
| 2015/0103452 | A1* | 4/2015 | Russ et al. ...................... 361/56 |

* cited by examiner

*Primary Examiner* — Stephen W Jackson
*Assistant Examiner* — Christopher Clark
(74) *Attorney, Agent, or Firm* — Cooper Legal Group, LLC (57) ABSTRACT

One or more electrostatic discharge (ESD) control circuit are disclosed herein. In an embodiment, an ESD control circuit has first and second trigger transistors, first and second ESD transistors, and first and second feedback transistors. The ESD transistors provide ESD current paths for ESD current generated during an ESD event. The first and second trigger transistors are on during normal operation to maintain the ESD transistors in an off state. During an ESD event, the first and second transistors are turned off to enable the first and second ESD transistors to provide ESD current paths. The first and second feedback transistors turn on during an ESD event to reinforce the on state of the ESD transistors and to reinforce the off state of the trigger transistors. In this way, the ESD control circuit stably provides multiple ESD current paths to discharge ESD current.

20 Claims, 8 Drawing Sheets

ELECTROSTATIC DISCHARGE (ESD) CONTROL CIRCUIT

BACKGROUND

Generally, an electrostatic discharge (ESD) control circuit provides an alternate path for ESD current that results from an ESD event. In this way, an ESD control circuit mitigates ESD current from entering circuitry that would be damaged by the ESD current.

SUMMARY

This summary is provided to introduce a selection of concepts in a simplified form that are further described below in the detailed description. This summary is not intended to be an extensive overview of the claimed subject matter, identify key factors or essential features of the claimed subject matter, nor is it intended to be used to limit the scope of the claimed subject matter.

One or more electrostatic discharge (ESD) control circuits are provided herein. Generally, ESD control circuits are associated with one or more non-MOS (metal oxide semiconductor) components. However, some non-MOS components require additional masks during semiconductor fabrication processing which, among other things, increases costs. Moreover, non-MOS components generally occupy a larger amount of valuable semiconductor real-estate. According to some embodiments, an ESD control circuit is thus provided herein where MOS components, such as MOS transistors, are used as triggers in the ESD control circuit. In this way, costs are reduced by mitigating a number of masks and masking operations needed during semiconductor fabrication processing. Additionally, packing densities are increased by allowing more circuitry to be fabricated in the same area or a smaller area. It is to be appreciated, however, that one or more embodiments provided herein are not required to solve particular problem(s), achieve particular benefit(s), etc. such as the foregoing or others mentioned herein.

In some embodiments, an ESD control circuit comprises merely MOS trigger components that do not require additional masks to be used during fabrication of the ESD control circuit. In some embodiments, the ESD control circuit comprises a first trigger transistor, a second trigger transistor, and a first ESD transistor. In some embodiments, a first trigger drain is connected to a second trigger gate. Additionally, a second trigger drain is connected to a first trigger gate and a first ESD gate. In this configuration, the first trigger transistor forms a positive feedback loop with the second trigger transistor, such that the first trigger transistor and the second trigger transistor reinforce one another and enhance ESD capabilities of the ESD control circuit by concurrently driving the first ESD gate and thus the first ESD transistor which provides a current path for ESD current during an ESD event.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 1:
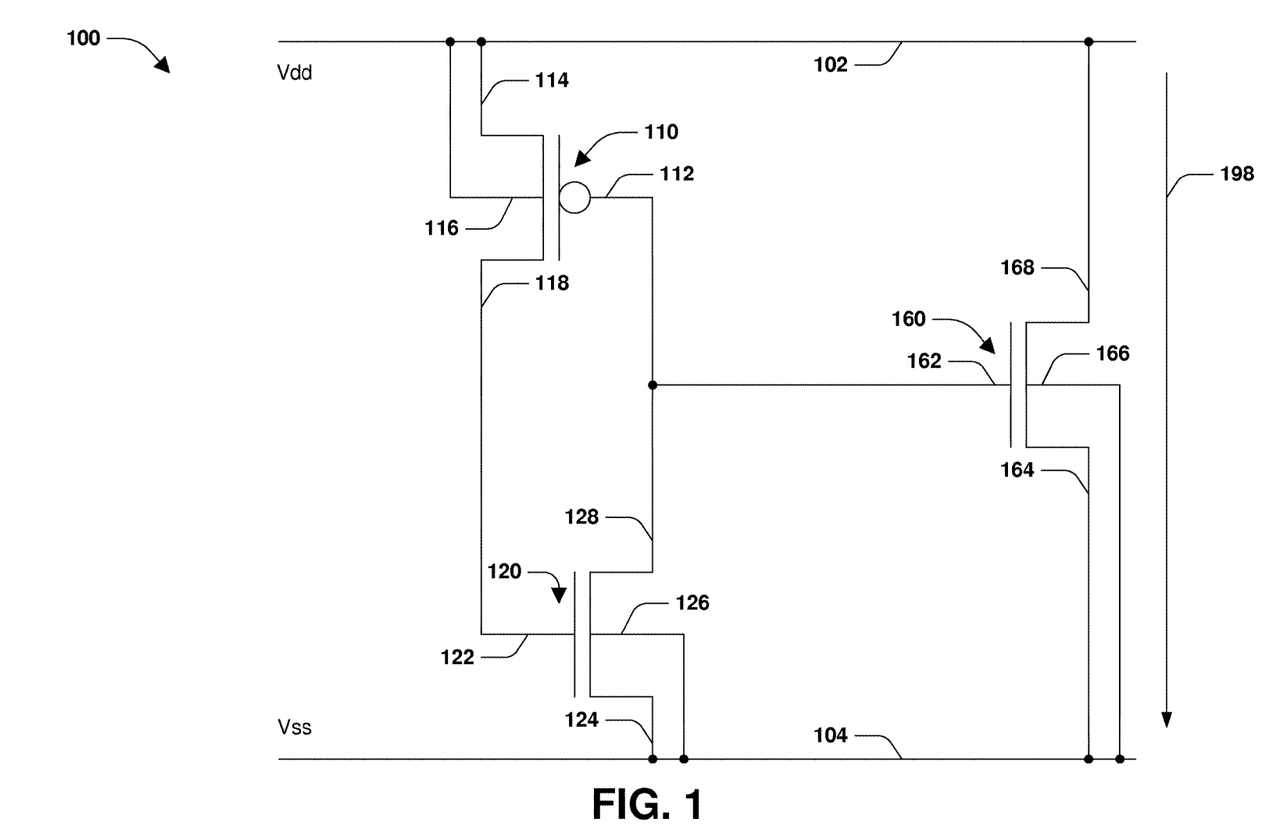
FIG. 1 is a schematic diagram of an example electrostatic discharge (ESD) control circuit, according to some embodiments.

FIG. 1 is a schematic diagram 100 of an example electrostatic discharge (ESD) control circuit, according to some embodiments. As will be appreciated the, the ESD control circuit generally operates in two modes: a normal mode, where an ESD event is not occurring, and an ESD mode, when an ESD event is occurring. When an ESD event occurs, ESD current is routed or discharged through a discharge path established in an ESD transistor of the ESD control circuit. Otherwise, during normal operation, the ESD transistor essentially operates as an open circuit, having little to no impact on associated circuitry.

The ESD control circuit comprises a first trigger transistor 110, a second trigger transistor 120, and a first ESD transistor 160. The first trigger transistor 110 is a p-type metal oxide semiconductor (PMOS) transistor, the second trigger transistor 120 is an n-type metal oxide semiconductor (NMOS) transistor, and the first ESD transistor 160 is an NMOS transistor, in some embodiments. The first trigger transistor 110 comprises a first trigger gate 112, a first trigger source 114, a first trigger body 116, and a first trigger drain 118. Similarly, the second trigger transistor 120 comprises a second trigger gate 122, a second trigger source 124, a second trigger body 126, and a second trigger drain 128. Additionally, the first ESD transistor 160 comprises a first ESD gate 162, a first ESD source 164, a first ESD body 166, and a first ESD drain 168.

In some embodiments, the first trigger source 114, the first trigger body 116, and the first ESD drain 168 are connected to a first supply voltage (Vdd) rail 102, which is a positive supply voltage in some embodiments. Additionally, the first trigger drain 118 is connected to the second trigger gate 122. The first trigger gate 112 is connected to the second trigger drain 128 and the first ESD gate 162. The second trigger source 124, the second trigger body 126, the first ESD source 164, and the first ESD body 166 are connected to a second supply voltage (Vss) rail 104, which is a negative supply voltage in some embodiments. Arrow 198 indicates a direction of ESD current flow when an ESD current discharge path is formed via the first ESD transistor 160 turning on, and thus acting as a short circuit. For example, the ESD current discharge path allows an ESD current to travel from the Vdd rail 102 to the Vss rail 104 via a conductive channel established between the first ESD drain 168 and the first ESD source 164.

Figure 2:
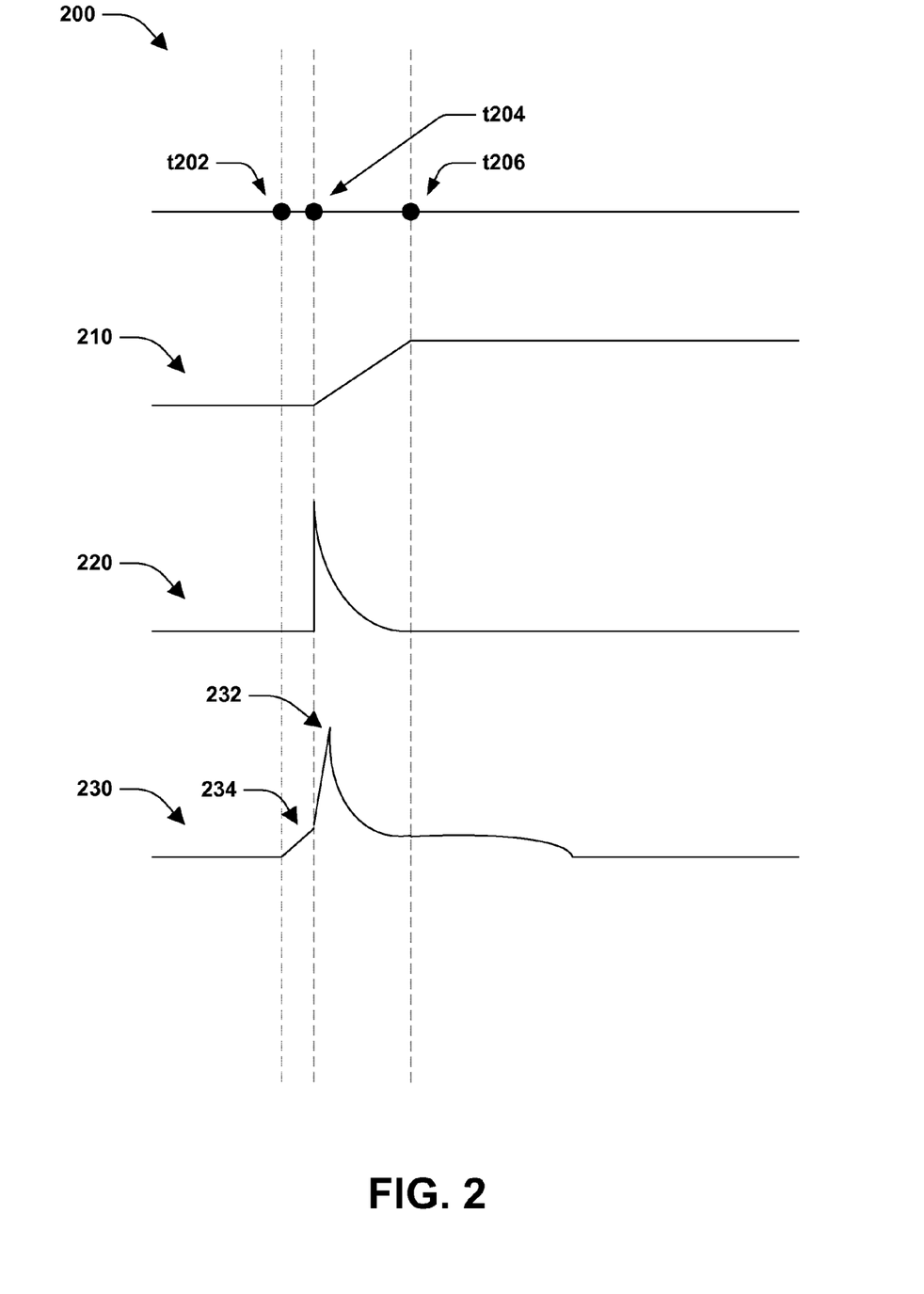
FIG. 2 is a timing diagram illustrating curves representative of different signals that are provided to an ESD control circuit, according to some embodiments.

FIG. 2 is a timing diagram 200 illustrating curves representative of different signals that are provided to an ESD control circuit, according to some embodiments. The signals depicted in FIG. 2 are, for example, provided to the Vdd rail 102 or the Vss rail 104 of an ESD control circuit. Signal 210 is indicative of a non-ESD event, such that application of signal 210 to the Vdd rail 102 or the Vss rail 104 results in no ESD current discharge path being formed from the Vdd rail to the Vss rail in the ESD control circuit, for example. Signal 210 is at a logic low voltage level at time t202 and begins rising at time t204. At time t206, signal 210 has risen to a logic high voltage level for normal operation of the ESD control circuit.

Signals 220 and 230 are, however, indicative of ESD events. Signal 220 is, for example, indicative of a first ESD event, and signal 230 is, for example, indicative of a second ESD event. When signal 220 or signal 230 is provided to the Vdd rail 102 or the Vss rail 104 of an ESD control circuit, an ESD current discharge path is formed within the ESD control circuit from the Vdd rail to the Vss rail. It will be appreciated that one or more ESD control circuits provided herein are capable of discharging ESD current associated with different types of ESD events, such as ESD current associated with the first ESD event and ESD current associated with the second ESD event. For example, one or more ESD control circuits as provided herein are capable of discharging ESD current associated with signal 230, which has both a leading pulse 234 and an ESD pulse 232. The leading pulse 234 comprises a first portion of signal 230 between time t202 and time t204. The ESD pulse 232 comprises a second portion of signal 230 after time t204, where the signal sharply rises after time t204 and then settles towards time t206. It will be appreciated that the relatively gradual slope of the leading pulse 234 is generally insufficient to trigger an ESD current path in an ESD circuit. However, as provided herein, a clamp is used to allow an ESD transistor to turn on to provide an ESD current path to discharge ESD current associated with the leading pulse 234. The ESD control circuit continues to provide an ESD current path for the second portion of the signal as well.

It will be appreciated that some of the respective Figs. are described herein with reference to some of the signals 210, 220, or 230 of FIG. 2. For example, with regard to FIG. 1, during normal operation when no ESD event is occurring, signal 210 is provided to the Vdd rail 102. Signal 210 is at a logic low voltage level at time t202, and begins rising at time t204. Signal 210 reaches a logic high voltage level at time t206. Prior to the signal 210 reaching the logic high voltage level at time t206, the first trigger gate 112 is at a voltage level that is less than the voltage level of signal 210 at time t206. For example, because no voltage is applied to the ESD control circuit prior to time t202, the voltage at the first trigger gate 112 is likely close to or at ground potential. Accordingly, when the logic high voltage level is applied to the Vdd rail 102 at time t206, the voltage at the first trigger source 114 is greater than the voltage at the first trigger gate 112. Given that the first trigger transistor 110 is a PMOS transistor, the first trigger transistor 110 is therefore turned on at time t206. When the first trigger transistor 110 is turned on, the first trigger source 114 and the first trigger drain 118 are effectively shorted to one another, which pulls the first trigger drain 118 towards the logic high voltage level at the first trigger source 114. The second trigger gate 122 is coupled to the first trigger drain 118 and is thus pulled towards the logic high voltage level as well when the first trigger transistor 110 turns on.

The second trigger transistor 120 is an NMOS transistor and the second trigger source 124 of the second trigger transistor 120 is coupled to Vss, which is at a logic low voltage level, such as ground, prior to time t206. Given the logic low voltage level at the second trigger source 124 and the logic high voltage level at the second trigger gate 122, the NMOS second trigger transistor 120 is turned on at time t206. It will thus be appreciated that in this configuration the first trigger transistor 110 effectively drives the second trigger transistor 120, such that when the first trigger transistor 110 turns on the second trigger transistor 120 turns on as well. Alternatively expressed, the second trigger transistor 120 follows the first trigger transistor 110.

When the second trigger transistor 120 is turned on, the second trigger source 124 and the second trigger drain 128 are effectively shorted to one another. Since the second trigger source 124 is connected to the Vss rail 104, the second trigger drain 128 is pulled towards the logic low voltage level at the Vss rail 104. The logic low voltage level is provided to the first trigger gate 112 of the first trigger transistor 110 at time t206 given the connection of the second trigger drain 128 to the first trigger gate 112. It will be appreciated that since the first trigger transistor 110 is a PMOS transistor, this logic low voltage level provided to the first trigger gate 112 serves to reinforce the on state of the first trigger transistor 110. Thus, not only does the first trigger transistor 110 drive the second trigger transistor 120 in the configuration illustrated in FIG. 1, but the second trigger transistor 120 serves to drive the first trigger transistor 110 as well. Accordingly, during a non ESD event, the first and second trigger transistors 110, 120 drive one another to maintain normal operation of the ESD control circuit.

In the illustrated FIG. 1, both the first trigger gate 112 of the first trigger transistor 110 and the second trigger drain 128 of the second trigger transistor 120 are coupled to the first ESD gate 162 of the first ESD transistor 160. Given that the first trigger gate 112 and the second trigger drain 128 are at the logic low voltage level at time t206, and given that the first ESD transistor 160 is an NMOS transistor, the first ESD transistor 160 is turned off at time t206 because the logic low voltage level is provided to the first ESD gate 162 as well. In this manner, during normal operation when no ESD event is occurring, the first ESD transistor 160 functions as an open circuit, such that an alternate current path is not provided by the ESD control circuit. It will thus be appreciated that in addition to driving one another to maintain their respective on states, the first and second trigger transistors 110, 120 also both drive the first ESD transistor 160 to maintain the first ESD transistor 160 in an off state during a non ESD event. This dual driving of the first and second trigger transistors 110, 120 maintains stability of the ESD control circuit, for example. As will be appreciated, the first and second trigger transistors 110, 120 similarly act in concert during an ESD event to turn on the first ESD transistor 160 during an ESD event to provide an ESD current discharge path for ESD current that would otherwise damage associated circuitry.

During an ESD event, such as indicated by signal 220 in FIG. 2, a high voltage or spike is provided to the Vdd rail 102. Signal 220 is at a logic low voltage level at time t202, and rises quickly or spikes at time t204. Signal 220 then settles after time t204 towards time t206. When signal 220 spikes or pulses at time t204, the first trigger source 114 transfers a voltage to the first trigger gate 112. Explained in another way, a transfer of electrical energy occurs at time t204 such that a portion of the voltage provided to the first trigger source 114 is transferred to the first trigger gate 112. By way of example, if an ESD pulse is associated with a peak of ten volts, the first trigger source 114 is at ten volts because the first trigger source 114 is connected to the Vdd rail 102, and the ESD pulse is provided to the Vdd rail 102. When a voltage transfer occurs between the first trigger source 114 and the first trigger gate 112, the first trigger gate 112 is about five volts, in an example, because a portion of the ten volts is transferred from the first trigger source 114 to the first trigger gate 112. In some embodiments, the five volts received by the first trigger gate 112 is equal to or higher than a logic high voltage level sufficient to turn off or turn on a transistor. Similarly, when the ESD pulse of signal 220 pulses at time t204, the first ESD drain 168 transfers a voltage to the first ESD gate 162 of the first ESD transistor 160, due to the quick rise time associated with the ESD pulse.

It will thus be appreciated that an ESD event as indicated by signal 220 thus causes the first trigger gate 112 and the first ESD gate 162 to be at the logic high voltage level, in some embodiments. Because the first trigger transistor 110 is a PMOS transistor and the first trigger gate 112 is at the logic high voltage level, the first trigger transistor 110 is turned off at time t204 or very shortly thereafter. When the first trigger transistor 110 is turned off it acts as an open circuit, effectively electrically disconnecting the first trigger drain 118 from the first trigger source 114. The second trigger gate 122 is thus disconnected from the Vdd rail 102 as well, and settles at a logic low voltage level. Because the second trigger transistor 120 is an NMOS transistor and the second trigger gate 122 is at a logic low voltage level, the second trigger transistor 120 is also turned off. Effectively, the ESD pulse at time t204 triggers the first trigger transistor 110 to turn off, which in turn causes the second trigger transistor 120 to turn off as well. In other words, the second trigger transistor 120 is configured to follow the first trigger transistor 110 during an ESD event. When the second trigger transistor 120 is off it acts as an open circuit such that the second trigger source 124 is electrically disconnected from the second trigger drain 128. The second trigger drain 128 is thus not connected to the Vss rail 104. In this manner, the first trigger gate 112 and the first ESD gate 162, which are connected to the second trigger drain 128, are not pulled towards a voltage level at the Vss rail 104. Accordingly, a logic high voltage level, resulting from the EDS pulse, is maintained at the first trigger gate 112 and the first ESD gate 162 during the ESD event.

Maintaining the logic high voltage level at the first trigger gate 112 serves to reinforce the off state of the first trigger transistor 110, which in turn serves to maintain the off state of the second trigger transistor 120. It will thus be appreciated that, as with a non ESD event, the first trigger transistor 110 drives the operation of the second trigger transistor 120, which in turn affects the operation of the first trigger transistor 110, allowing the first trigger transistor 110 to be maintained in an off state due to a transfer of voltage to the first trigger gate 112 from the ESD event, for example. This complementary behavior between the first and second trigger transistors 110, 120 enhances stability and robustness of the ESD control circuit, for example, by keeping transistors 110 and 120 off when desired.

Given that the second trigger transistor 120 is effectively decoupled from the first trigger transistor 110 and the first ESD transistor 160 during the ESD event, and thus the first ESD gate 162 is not pulled toward a logic low voltage level from Vss, the first ESD transistor 160 is enabled to turn on to create a discharge path for ESD current that would otherwise damage associated circuitry. For example, the pulse provided to the first ESD drain 168 from the Vdd rail 102 during the ESD event at time t204 and the resulting logic high voltage level transferred to the first ESD gate 162 of the first ESD transistor 160 causes the first ESD transistor 160 to be turned on to provide an ESD current path from Vdd to Vss.

Figure 3:
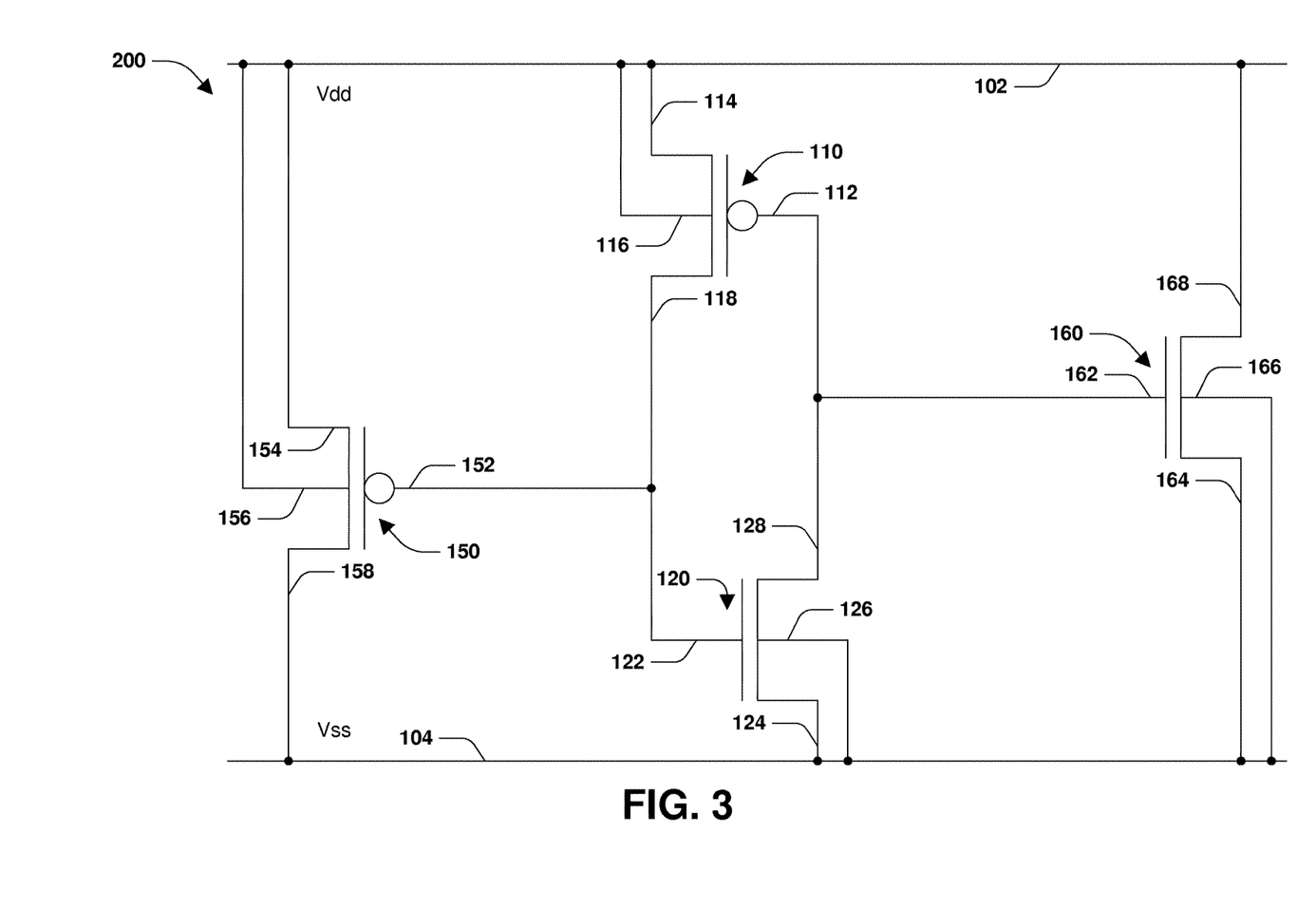
FIG. 3 is a schematic diagram of an example electrostatic discharge (ESD) control circuit, according to some embodiments.

FIG. 3 is a schematic diagram 300 of an example electrostatic discharge (ESD) control circuit, according to some embodiments. The ESD control circuit of FIG. 3 is similar to the ESD control circuit of FIG. 1, except that the ESD control circuit of FIG. 3 comprises a second ESD transistor 150 to provide a second discharge path for ESD current to further protect associated circuitry. The second ESD transistor 150 is a PMOS transistor that comprises a second ESD gate 152, a second ESD source 154, a second ESD body 156, and a second ESD drain 158. The second ESD gate 152 is connected to the first trigger drain 118 and the second trigger gate 122. The second ESD source 154 and the second ESD body 156 are connected to the Vdd rail 102. The second ESD drain 158 is connected to the Vss rail 104.

During normal operation, signal 210 of FIG. 2, for example, is provided to the Vdd rail 102 of the ESD control circuit of FIG. 3. As described with regard to FIG. 1 and FIG. 2, the first trigger transistor 110 is turned on. Because of this, the second ESD gate 152 is pulled towards a logic high voltage level at the first trigger source 114. As a result, the second ESD transistor 150 is turned off. Therefore, the second ESD transistor 150 functions as an open circuit during normal operation and has no electrical effect on other circuit elements. It will be appreciated that the normal operations associated with the first trigger transistor 110, the second trigger transistor 120, and the first ESD transistor 160 are similar to the normal operations described with regard to FIG. 1 in conjunction with additional transistors, such as the second ESD transistor 150. For example, the first ESD transistor 160 similarly remains off and electrically disconnected during normal operation.

During an ESD event, as explained above with reference to FIG. 1, the first trigger gate 112 is at a logic high voltage level and the first trigger transistor 110 is turned off. Further, the second trigger transistor 120 follows the first trigger transistor 110 and the second trigger transistor 120 is turned off as well, thus serving as an open circuit. The second ESD gate 152 settles at a logic low voltage level after the ESD pulse because the second ESD gate 152 is disconnected from the Vdd rail 102 when the first trigger transistor 110 turns off. When the ESD gate 152 settles at a logic low voltage level, the second ESD transistor 150 is turned on. This creates an ESD current discharge path from the Vdd rail 102 to the Vss rail 104 via the second ESD transistor 150, because the second ESD source 154 is effectively shorted to the second ESD drain 158. It will be appreciated that the operations associated with the first trigger transistor 110, the second trigger transistor 120, and the first ESD transistor 160 during an ESD event are similar to the operations described with regard to FIG. 1 in conjunction with additional transistors, such as the second ESD transistor 150. Additionally, when an ESD pulse, such as a negative ESD pulse (not shown), enters the Vss rail 104, the second trigger transistor 120 is turned off. Since the second trigger transistor 120 is off, the first trigger transistor 110 follows and turns off. In this scenario a positive feedback loop is initiated by the second trigger transistor 120, rather than the first trigger transistor 110. Again, however, when both the trigger transistors 110 and 120 are off, both ESD transistors 150 and 160 turn on and form ESD current discharge paths.

It will be appreciated that the control circuit design associated with the ESD control circuit of FIG. 1 and FIG. 3 is regarded as a double trigger design in some instances because the first trigger transistor 110 and the second trigger transistor 120 are configured to bias an ESD transistor, such as 150 or 160, in a concurrent fashion. Because two trigger transistors 110 and 120, rather than one trigger transistor, are biasing the ESD transistor, a faster activation is generally associated with a double trigger ESD control circuit than a single trigger ESD control circuit comprising a single trigger transistor. Additionally, the ESD control circuit merely comprises MOS transistor components, thereby mitigating a requirement for additional masks or additional layout area.

It will be appreciated that when signal 230 of FIG. 2 is provided to the Vdd rail 102 of the ESD control circuit, the ESD control circuit remains in normal operation mode until time t204, when a fast rise time associated with the ESD pulse 232 enables a transfer of voltage from the first trigger source 114 to the first trigger gate 112. When this occurs, ESD operation is achieved, as described above.

Figure 4:
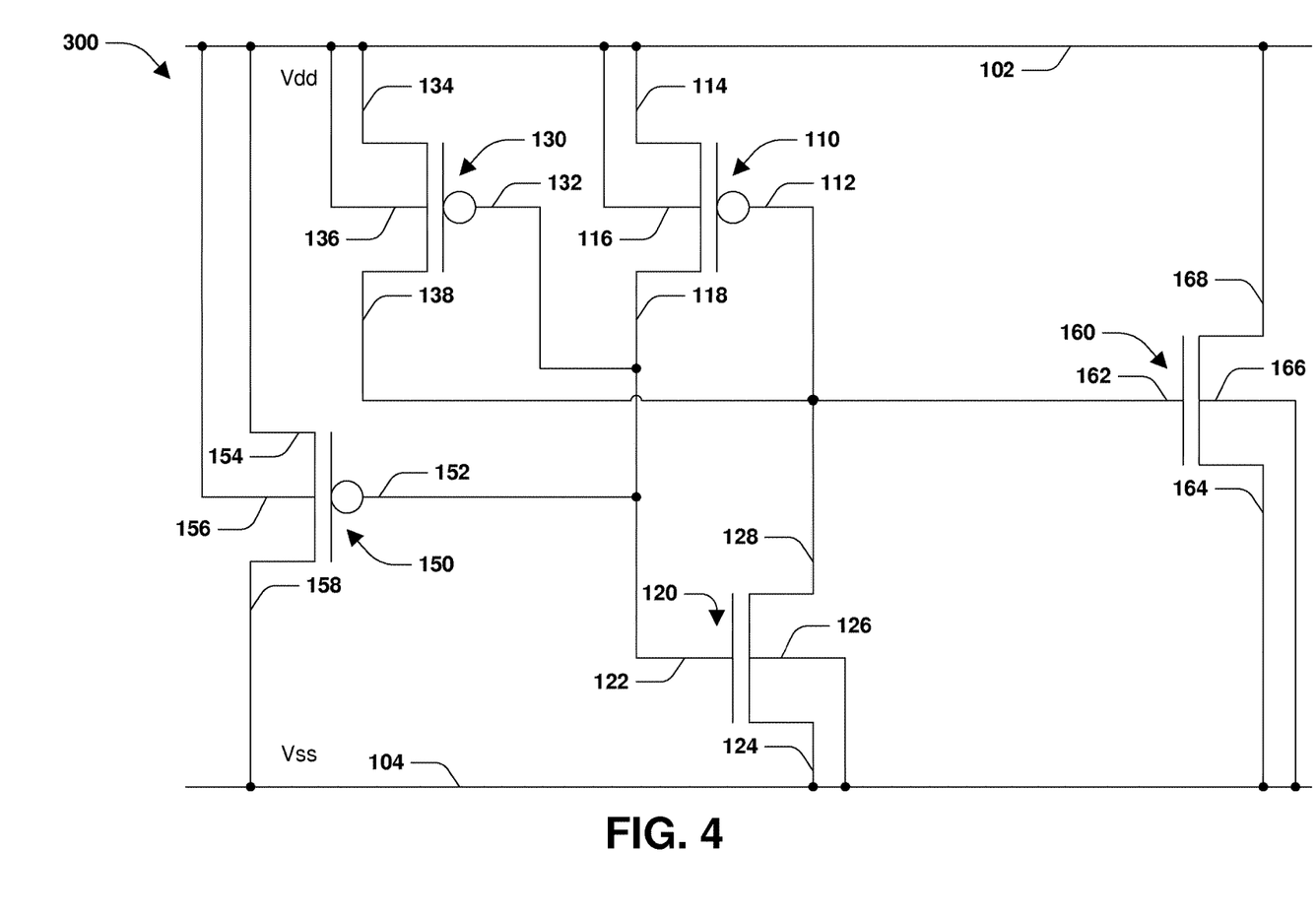
FIG. 4 is a schematic diagram of an example electrostatic discharge (ESD) control circuit, according to some embodiments.

FIG. 4 is a schematic diagram 400 of an example electrostatic discharge (ESD) control circuit, according to some embodiments. The ESD control circuit of FIG. 4 is similar to the ESD control circuit of FIG. 3, except that the ESD control circuit of FIG. 4 comprises a first feedback transistor 130 configured to, among other things, reinforce operation of the first trigger transistor 110, the second trigger transistor 120, the second ESD transistor 150, and the first ESD transistor 160. The first feedback transistor 130 is a PMOS transistor that comprises a first feedback gate 132, a first feedback source 134, a first feedback body 136, and a first feedback drain 138. The first feedback gate 132 is connected to the first trigger drain 118, the second trigger gate 122, and the second ESD gate 152. The first feedback source 134 and the first feedback body 136 are connected to the Vdd rail 102. The first feedback drain 138 is connected to the first trigger gate 112, the second trigger drain 128, and the first ESD gate 162.

During normal operation, signal 210 is provided to the Vdd rail 102 of the ESD control circuit of FIG. 4. As a result, the first trigger transistor 110 is turned on. When the first trigger transistor 110 is on, the first feedback gate 132 is pulled towards a logic high voltage level at the first trigger source 114. Accordingly, the first feedback transistor 130 is turned off and has no electrical effect on other circuit elements. It will be appreciated that the normal operations associated with the first trigger transistor 110, the second trigger transistor 120, the first ESD transistor 160, and the second ESD transistor 150 are similar to the normal operations described with regard to FIG. 3 in conjunction with additional transistors, such as the first feedback transistor 130.

During an ESD event, as explained above with regard to FIG. 3, both trigger transistors 110 and 120 are off. When the first trigger transistor 110 is off, it functions as an open circuit, thereby disconnecting the first feedback gate 132 from the Vdd rail 102. Because the first feedback transistor 130 is a PMOS transistor, when the first feedback gate 132 is disconnected from the Vdd rail 102, the first feedback gate 132 drops to a logic low voltage level and causes the first feedback transistor 130 to turn on. When the first feedback transistor 130 turns on, the first feedback drain 138 is effectively shorted to the first feedback source 134. In this manner, the first trigger gate 112 and the first ESD gate 162, which are coupled to the first feedback drain 138, are pulled towards the logic high voltage level at the Vdd rail 102 through the first feedback transistor 130. The first feedback transistor 130 thus reinforces the off state of the first trigger transistor 110 by providing a logic high voltage level to the first trigger gate 112, and similarly reinforces the on state of the first ESD transistor 160 by providing the logic high voltage level to the first ESD gate 162. The first feedback transistor 130 also serves to reinforce the off state of the second trigger transistor 120 and the on state of the second ESD transistor 150. For example, the first feedback transistor 130 serves to maintain the voltage provided to the second ESD gate 152 and the second trigger gate 122 at a logic low voltage level, by reinforcing the off state of the first trigger transistor 110, for example. It will be appreciated that, as described above, providing a logic low voltage level at the second ESD gate 152 serves to turn on the second ESD transistor 150, and that providing a logic low voltage level to second trigger gate 122 serves to turn off the second trigger transistor 120. It will be appreciated that the operations associated with the first trigger transistor 110, the second trigger transistor 120, the first ESD transistor 160, and the second ESD transistor 150 during an ESD event are similar to the operations described with regard to FIG. 3, in conjunction with the first feedback transistor 130.

It will be appreciated that when signal 230 of FIG. 2 is provided to the Vdd rail 102 of the ESD control circuit, the ESD control circuit remains in normal operation mode until time t204, when a fast rise time associated with the ESD pulse 232 enables a transfer of voltage from the first trigger source 114 to the first trigger gate 112. When this occurs, ESD operation is achieved, as described above.

Figure 5:
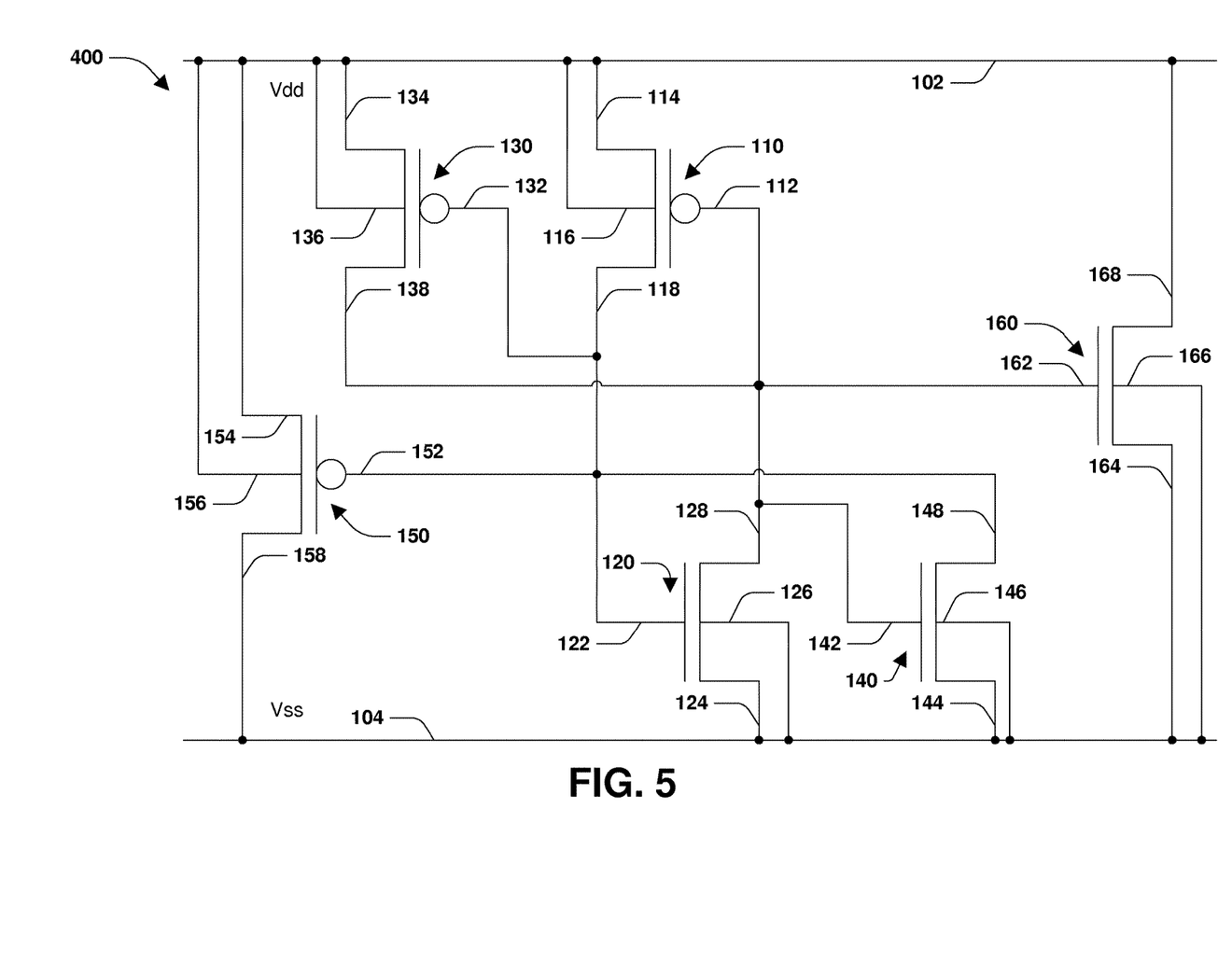
FIG. 5 is a schematic diagram of an example electrostatic discharge (ESD) control circuit, according to some embodiments.

FIG. 5 is a schematic diagram 500 of an example electrostatic discharge (ESD) control circuit, according to some embodiments. The ESD control circuit of FIG. 5 is similar to the ESD control circuit of FIG. 4, except that the ESD control circuit of FIG. 4 comprises a second feedback transistor 140 configured to, among other things, reinforce operation of the first trigger transistor 110, the second trigger transistor 120, the first ESD transistor 160, the second ESD transistor 150, and the first feedback transistor 130. The second feedback transistor 140 is an NMOS transistor that comprises a second feedback gate 142, a second feedback source 144, a second feedback body 146, and a second feedback drain 148. The second feedback gate 142 is connected to the second trigger drain 128, the first trigger gate 112, the first ESD gate 162, and the first feedback drain 138. The second feedback source 144 and the second feedback body 146 are connected to the Vss rail 104. The second feedback drain 148 is connected to the second trigger gate 122, the first trigger drain 118, the second ESD gate 152, and the first feedback gate 132.

During normal operation, signal 210 is provided to the Vdd rail 102 of the ESD control circuit of FIG. 5. As a result, the first trigger transistor 110 and the second trigger transistor 120 are both turned on. As a result of the second trigger transistor 120 being on, the second feedback gate 142 is pulled toward a logic low voltage level at the second trigger source 124. Accordingly, the second feedback transistor 140 is off and has no electrical effect on other circuit elements. It will be appreciated that the normal operations associated with the first trigger transistor 110, the second trigger transistor 120, the first ESD transistor 160, the second ESD transistor 150, and the first feedback transistor 130 are similar to the normal operations described with regard to FIG. 4 in conjunction with additional transistors, such as the second feedback transistor 140.

During an ESD event, as explained above with regard to FIG. 4, both trigger transistors 110 and 120 turn off. Because the second trigger transistor 120 is off, the second feedback gate 142 is pulled towards the logic high voltage level of the first trigger gate 112. In this way, the second feedback transistor 140 is turned on, and the second feedback drain 148 is pulled towards a logic low voltage level at the second feedback source 144. Because the second feedback transistor 140 is on, the second trigger gate 122, the second ESD gate 152, the first feedback gate 132, and the first trigger drain 118 are pulled towards the logic low voltage level, which reinforces the off state of the second trigger transistor 120, the on state of the second ESD transistor 150, and the on state of the first feedback transistor 130. Because the second feedback transistor 140 reinforces the off state of the second trigger transistor 120, which, in turn, maintains the logic high voltage level at the first trigger gate 112 and the first ESD gate 162, the second feedback transistor also effectively reinforces the off state of the first trigger transistor 110 and the on sate of the first ESD transistor 160. It will be appreciated that the operations associated with the first trigger transistor 110, the second trigger transistor 120, the first ESD transistor 160, the second ESD transistor 150, and the first feedback transistor 130 during an ESD event are similar to the operations described with regard to FIG. 4, in conjunction with the second feedback transistor 140.

It will be appreciated that when signal 230 of FIG. 2 is provided to the Vdd rail 102 of the ESD control circuit, the ESD control circuit remains in normal operation mode until time t204, when a fast rise time associated with the ESD pulse 232 enables a transfer of voltage from the first trigger source 114 to the first trigger gate 112. When this occurs, ESD operation is achieved, as described above.

Figure 6:
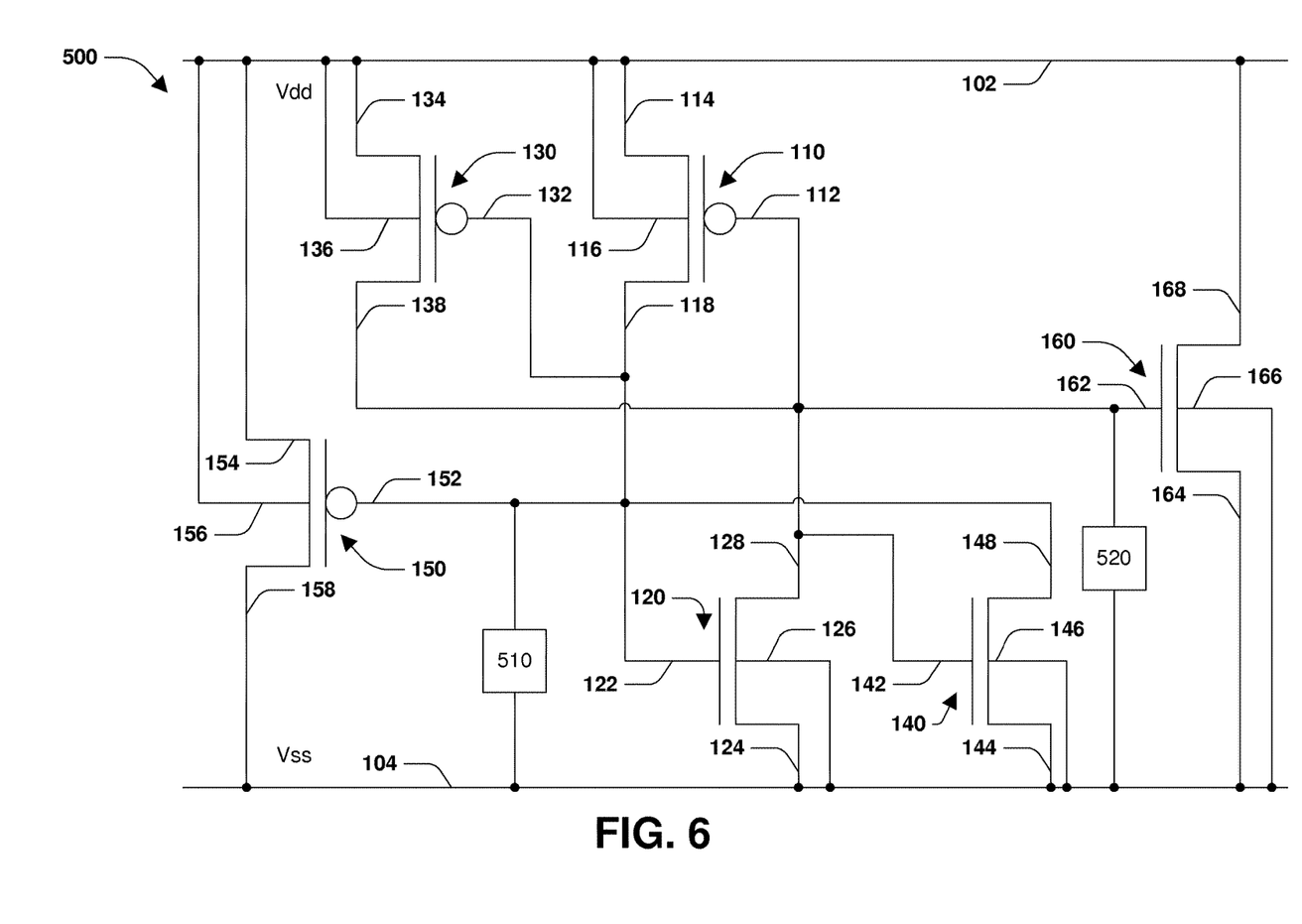
FIG. 6 is a schematic diagram of an example electrostatic discharge (ESD) control circuit, according to some embodiments.

FIG. 6 is a schematic diagram 600 of an example electrostatic discharge (ESD) control circuit, according to some embodiments. The ESD control circuit of FIG. 6 is similar to the ESD control circuit of FIG. 5, except that the ESD control circuit of FIG. 6 comprises a diode string 510 and a shut off resistor 520. It will be appreciated that the diode string 510 serves to clamp or maintain a voltage at the first feedback gate 132, and that the shut off resistor 520 helps to control a settling time of the first ESD transistor 160. The diode string 510 comprises one or more diodes, in some embodiments. The diode string 510 is connected to the second ESD gate 152, the first feedback gate 132, the first trigger drain 118, the second trigger gate 122, the second feedback drain 148, and the Vss rail 104.

During normal operation, signal 210 is provided to the Vdd rail 102 of the ESD control circuit of FIG. 6. As a result, the first trigger transistor 110 and the second trigger transistor 120 are both turned on, and the first feedback transistor 130 and the second feedback transistor 140 are both off. When the first feedback transistor 130 and the second feedback transistor 140 are off, the diode string 510 and shut off resistor 520 are disconnected from the ESD control circuit and have no electrical effect on other circuit elements. For example, when the first feedback transistor 130 is off, it acts as an open circuit such that the shut off resistor 520 is essentially coupled to this open circuit and is disconnected from the ESD control circuit. Similarly, when the second feedback transistor 140 is off, it also acts as an open circuit such that the diode string 510 is essentially coupled to this open circuit and disconnected from the ESD control circuit. It will be appreciated that the normal operations associated with the first trigger transistor 110, the second trigger transistor 120, the first ESD transistor 160, the second ESD transistor 150, the first feedback transistor 130, and the second feedback transistor 140 are similar to the normal operations described with regard to FIG. 5 in conjunction with additional components, such as diode string 510 and shut off resistor 520.

During an ESD event, when signal 230 is provided to the Vdd rail 102, the leading pulse 234 does not exhibit a fast enough rise time for a voltage transfer to occur between a source and a gate of a transistor, such as from the first trigger source 114 to the first trigger gate 112. As a result, the first trigger gate 112 remains at a logic low voltage level and the first trigger transistor 110 remains on. The diode string 510 is, however, configured to clamp the voltage at the first feedback gate 132 such that the voltage is at least one threshold below the voltage level at the Vdd rail 102. In other words, the diode string 510 is configured to clamp the voltage at the first feedback gate 132 in a manner that turns the first feedback transistor 130 on in response to leading pulse 234. For example, the diode string 510 clamps the voltage at the first feedback gate 132 such that an absolute value of a voltage drop across the first trigger source 134 to the first trigger gate 132 ($V_{gs}$) is greater than an absolute value of a threshold voltage for the first feedback transistor 130, such that the first feedback transistor 130 is turned on. In some embodiments, the voltage clamped at the first feedback gate 132 is adjusted based on a number of diodes in the diode string. It is to be appreciated that while a diode string is mentioned herein, the instant application, including the scope of the appended claims, is not limited to the same. For example, other clamp circuits, such as those configured to clamp a voltage as provided herein, are within the contemplated scope of the present disclosure.

Since the first feedback transistor 130 is on, the first feedback drain 138, the first trigger gate 112, the first ESD gate 162, and the second feedback gate 142 are pulled toward the voltage level of the Vdd rail 102 at the first feedback source 134. As a result, the first trigger transistor 110 is turned off, the first ESD transistor 160 is turned on, and the second feedback transistor 140 is turned on. The diode string 510 also clamps the voltage at the second ESD gate 152 such that the second ESD transistor 150 is turned on in response to the leading pulse 234. The diode string 510 also clamps the voltage provided to the second trigger gate 122 such that the second trigger transistor 120 is turned off. It will be appreciated that the ESD control circuit of FIG. 6 continues to provide discharge paths for ESD current after the leading pulse 234, such as at ESD pulse 232 after time t204.

In some embodiments, the ESD control circuit comprises a shut off resistor 520 connected to the Vss rail 104, the first trigger gate 112, and the first ESD gate 162. When a component such as a resistor is along a path from a gate of a transistor to the Vss rail 104, the gate of the transistor is pulled towards the logic low voltage level in a controlled fashion as a function of a resistance of the shut off resistor 520, for example. In some embodiments, the resistance of the shut off resistor 520 is determined by simulation, observation or other techniques. In some embodiments, the resistance of the shut off resistor 520 is selected such that the first ESD gate 162 settles to a logic low voltage level after an ESD event in a desired amount of time, such as specified by a customer, for example. It is to be appreciated that while a resistor is mentioned herein, the instant application, including the scope of the appended claims, is not limited to the same. For example, other resistive devices, such as those configured to settle a voltage as provided herein, are within the contemplated scope of the present disclosure. By way of example and not limitation, a shut off circuit connected to the Vss rail 104 and the first ESD gate 162 is configured to settle the voltage at the first ESD gate 162, such as in a controllable manner. In some embodiments, the shut off circuit comprises a resistive element, and in some embodiments the resistive element comprises a resistor.

It will be appreciated that the diode string 510 is applicable to at least some of the ESD control circuits illustrated in FIG. 3, FIG. 4, and FIG. 5. With reference to FIG. 4 and FIG. 5, for example, a diode string 510 connected to the first feedback gate 132 and the Vss rail 104 enables the first feedback transistor 130 to turn on when the first trigger transistor 110 is on. With reference to FIG. 3, FIG. 4, and FIG. 5, a diode string 510 connected to the second ESD gate 152 and the Vss rail 104 enables the second ESD transistor 150 to turn on when the first trigger transistor 110 is on.

Similarly, the shut off resistor 520 is applicable to at least some of the ESD control circuits illustrated in FIG. 1, FIG. 3, FIG. 4, and FIG. 5. For example, a shut off resistor 520 connected to the first ESD gate 162 and the Vss rail 104 enables the first ESD gate 162 to settle at a logic low voltage level in a controlled manner, such as, for example, after a predetermined amount of time, depending on a resistance value. As discussed above, during normal operation the shut off resistor 520 is disconnected from the ESD control circuit and has no electrical effect on other circuit elements.

During normal operation, signal 210 is provided to the Vdd rail 102 of the ESD control circuit. As a result, the first trigger transistor 110 and the second trigger transistor 120 are both turned on. As previously discussed, the first feedback transistor 130, the second feedback transistor 140, the first ESD transistor 160, and the second transistor 150 are off, and thus have no electrical effect on the ESD circuit during normal operation.

Figure 7:
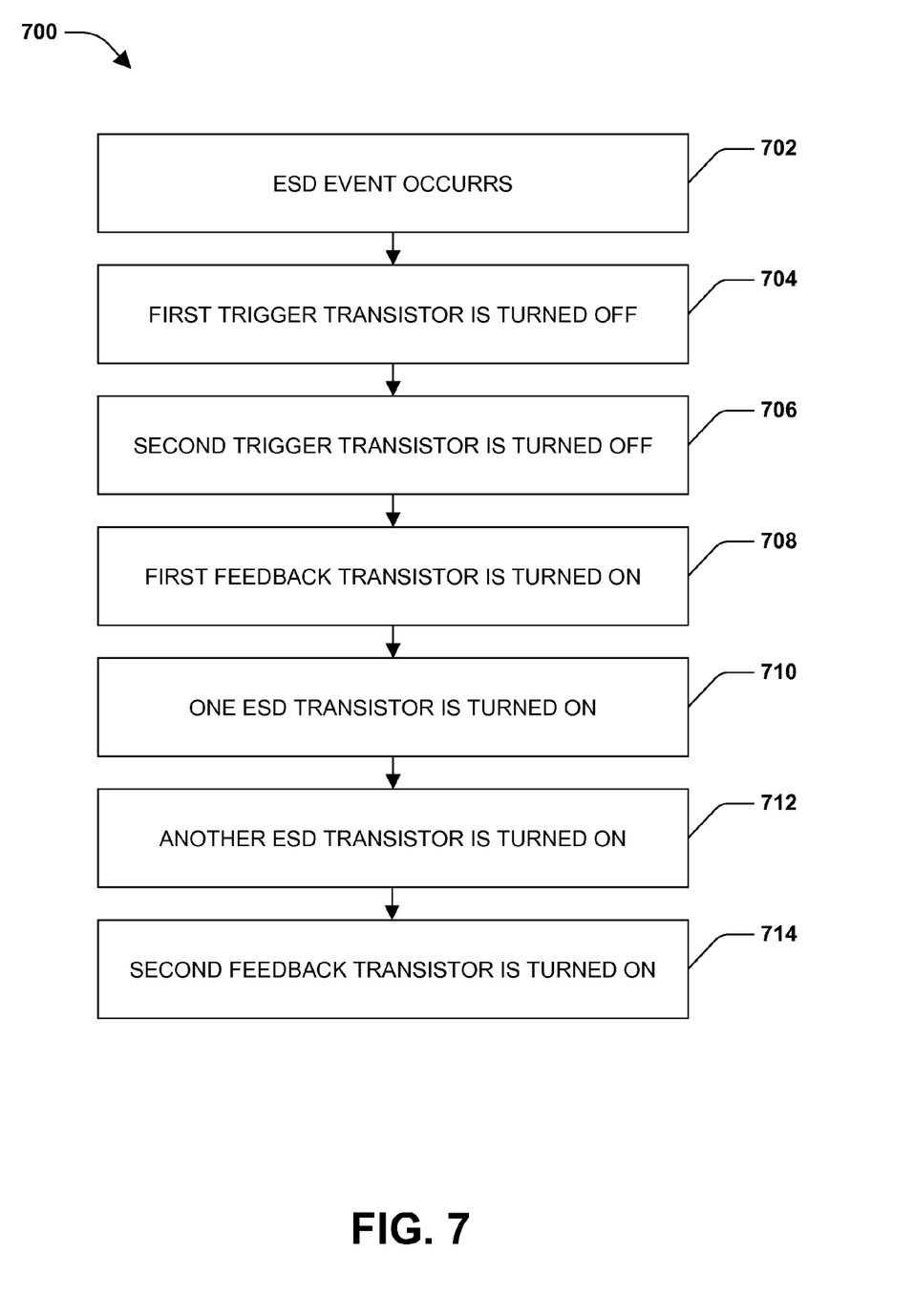
FIG. 7 is a flow diagram of an example method for controlling electrostatic discharge (ESD), according to some embodiments.

FIG. 7 is a flow diagram of an example method 700 for controlling electrostatic discharge (ESD), according to some embodiments. In this example, the ESD control circuit of FIG. 5 is used. At 702, an ESD event occurs, such as signal 220 of FIG. 2 being provided to the Vdd rail 102 and entering the first trigger source 114. As a result, the first trigger transistor 110 is turned off at 704, and the second trigger transistor 120 is turned off at 706. Because the first trigger transistor 110 and the second trigger transistor 120 are off, the first feedback gate 132 and the second ESD gate 152 are at a logic low voltage level. As a result, the first feedback transistor 130 is turned on at 708, and the second ESD transistor 150 is turned on at 710. Because the first feedback transistor 130 is on, a logic high voltage level is provided to the first feedback drain 138 from the first feedback source 134. Because the first ESD gate 162 is coupled with the first feedback drain 138, the logic high voltage level is provided to the first ESD gate 162. As a result, the first ESD transistor 160 is turned on at 712. Because the second feedback gate 142 is also coupled to the first feedback drain 138, the logic high voltage level is provided to the second feedback gate 142 as well. As a result, the second feedback transistor 140 is turned on at 714. Accordingly, during an ESD event, such as from signal 220, the first trigger transistor 110 and the second trigger transistor 120 are turned off, while the first feedback transistor 130, the second feedback transistor 140, the first ESD transistor 160, and the second ESD transistor 150 are turned on. The first feedback transistor 130 and the second feedback transistor 140 are turned on to reinforce the first trigger transistor 110 and the second trigger transistor 120 being off, and to reinforce the first ESD transistor 160 and the second ESD transistor 150 being on. The ESD control circuit is thus stabilized such that two separate ESD current paths are provided to discharge ESD current.

Figure 8:
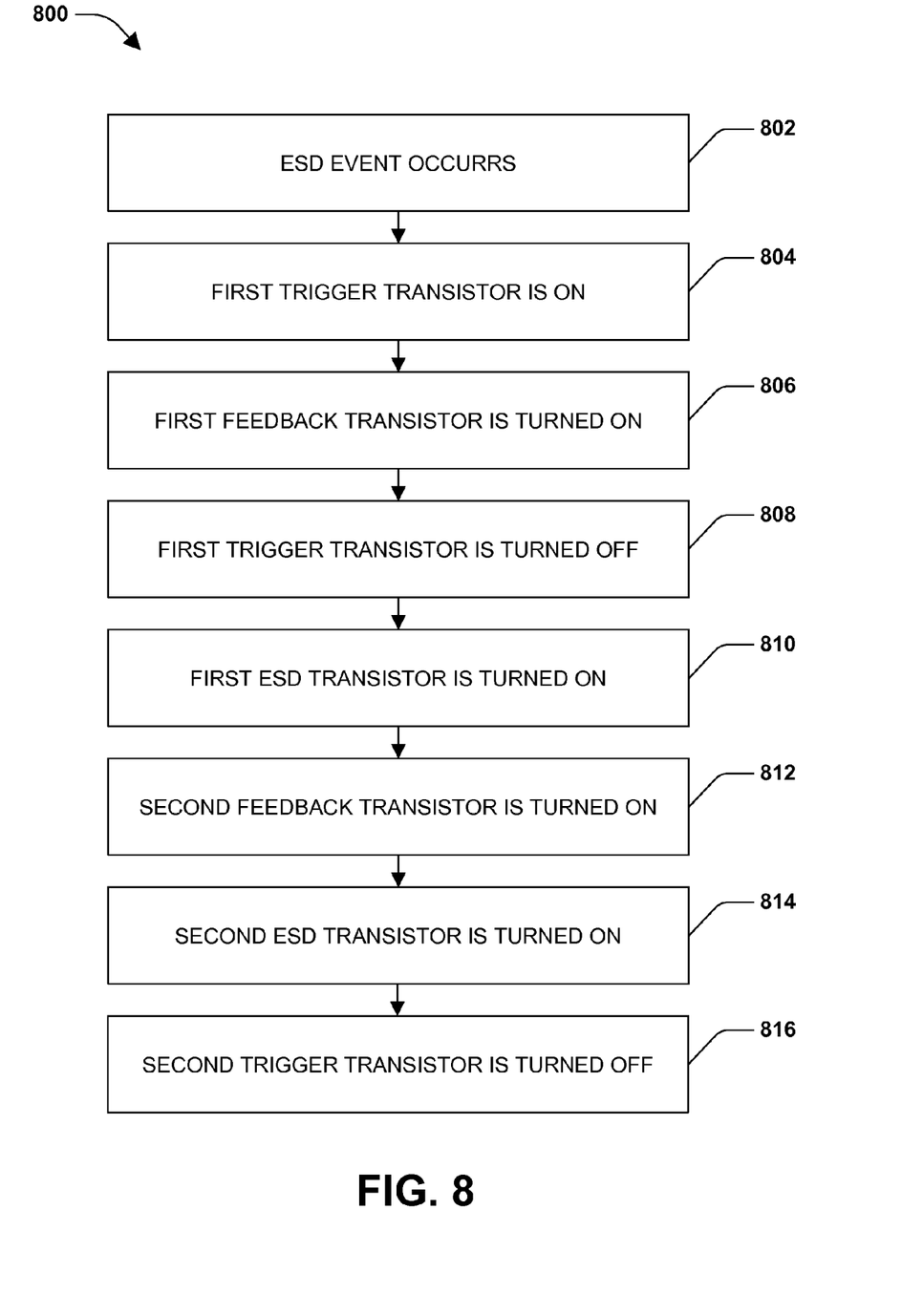
FIG. 8 is a flow diagram of an example method for controlling electrostatic discharge (ESD), according to some embodiments.

FIG. 8 is a flow diagram of an example method 800 for controlling electrostatic discharge (ESD), according to some embodiments. In this example, the ESD control circuit of FIG. 6 is used. At 802, an ESD event occurs, such as signal 230 of FIG. 2 being provided to the Vdd rail 102 and entering the first trigger source 114. The leading pulse 234 of signal 220 is insufficient to turn off the first trigger transistor 110, and thus the first trigger transistor 110 initially remains on at 804. However, because the diode string 510 clamps the voltage at the first feedback gate 132, the first feedback transistor 130 is turned on at 806 in response to the leading pulse 234. Because the first feedback transistor 130 is on, the first feedback drain 138, the first trigger gate 112, the second ESD gate 162, and the second feedback gate 142 are pulled toward the voltage level of the Vdd rail 102 at the first feedback source 134. As a result, the first trigger transistor 110 is turned off at 808, the first ESD transistor 160 is turned on at 810, and the second feedback transistor 140 is turned on at 812. The diode string 510 also clamps the voltage at the second ESD gate 152 such that the second ESD transistor 150 is turned on at 814 in response to the leading pulse 234. The diode string 510 also clamps the voltage at the second trigger gate 122 such that the second trigger transistor 150 is turned off at 816. Accordingly, during an ESD event, such as from signal 230, the first feedback transistor 130 is turned on. When the first feedback transistor 130 is turned on, the first trigger transistor 110 and the second trigger transistor 120 are turned off, while the second feedback transistor 140, the first ESD transistor 160, and the second ESD transistor 150 are turned on. The ESD control circuit thus provides multiple ESD current discharge paths even during a leading edge of an ESD signal.

According to some aspects, an electrostatic discharge (ESD) control circuit is provided, comprising a first trigger transistor comprising a first trigger gate, a first trigger source, and a first trigger drain. In some embodiments, the ESD control circuit comprises a second trigger transistor comprising a second trigger gate, a second trigger source, and a second trigger drain. In some embodiments, the ESD control circuit comprises a first electrostatic discharge (ESD) transistor comprising a first ESD gate, a first ESD source, and a first ESD drain. In some embodiments, the first trigger source and the first ESD drain are connected to a first supply voltage (Vdd) rail. In some embodiments, the second trigger source and the first ESD source are connected to a second supply voltage (Vss) rail. In some embodiments, the first ESD gate is connected to the first trigger gate and the second trigger drain. In some embodiments, the first trigger drain is connected to the second trigger gate.

According to some aspects, an electrostatic discharge (ESD) control circuit is provided, comprising a first trigger transistor comprising a first trigger gate, a first trigger source, and a first trigger drain. In some embodiments, the ESD control circuit comprises a second trigger transistor comprising a second trigger gate, a second trigger source, and a second trigger drain. In some embodiments, the ESD control circuit comprises a first feedback transistor comprising a first feedback gate, a first feedback source, and a first feedback drain. In some embodiments, the ESD control circuit comprises a second feedback transistor comprising a second feedback gate, a second feedback source, and a second feedback drain. In some embodiments, the ESD control circuit comprises a first electrostatic discharge (ESD) transistor comprising a first ESD gate, a first ESD source, and a first ESD drain. In some embodiments, the ESD control circuit comprises a second ESD transistor comprising a second ESD gate, a second ESD source, and a second ESD drain. In some embodiments, the first ESD gate is connected to the first trigger gate, the first feedback drain, the second trigger drain, and the second feedback gate. In some embodiments, the second ESD gate is connected to the first trigger drain, the first feedback gate, the second trigger gate, and the second feedback drain.

According to some aspects, an electrostatic discharge (ESD) control circuit is provided, comprising a diode string comprising one or more diodes. In some embodiments, the ESD control circuit comprises a first trigger transistor comprising a first trigger gate, a first trigger source, and a first trigger drain. In some embodiments, the ESD control circuit comprises a second trigger transistor comprising a second trigger gate, a second trigger source, and a second trigger drain. In some embodiments, the ESD control circuit comprises a first feedback transistor comprising a first feedback gate, a first feedback source, and a first feedback drain. In some embodiments, the ESD control circuit comprises a second feedback transistor comprising a second feedback gate, a second feedback source, and a second feedback drain. In some embodiments, the ESD control circuit comprises a first electrostatic discharge (ESD) transistor comprising a first ESD gate, a first ESD source, and a first ESD drain. In some embodiments, the ESD control circuit comprises a second ESD transistor comprising a second ESD gate, a second ESD source, and a second ESD drain. In some embodiments, the first ESD gate is connected to the first trigger gate, the first feedback drain, the second trigger drain, and the second feedback gate. In some embodiments, the second ESD gate connected to the first trigger drain, the first feedback gate, the second trigger gate, the second feedback drain, and the diode string.

Although the subject matter has been described in language specific to structural features or methodological acts, it is to be understood that the subject matter of the appended claims is not necessarily limited to the specific features or acts described above. Rather, the specific features and acts described above are disclosed as exemplary embodiments.

Various operations of embodiments are provided herein. The order in which some or all of the operations are described should not be construed as to imply that these operations are necessarily order dependent. Alternative ordering will be appreciated based on this description. Further, it will be understood that not all operations are necessarily present in each embodiment provided herein. Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or identical channels or the same channel.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. An electrostatic discharge (ESD) control circuit, comprising:
   a first trigger transistor comprising a first trigger gate, a first trigger source, and a first trigger drain;
   a second trigger transistor comprising a second trigger gate, a second trigger source, and a second trigger drain;
   a first electrostatic discharge (ESD) transistor comprising a first ESD gate, a first ESD source, and a first ESD drain; and
   a second ESD transistor comprising a second ESD gate, a second ESD source, and a second ESD drain, wherein:
      the first trigger source and the first ESD drain are directly connected to a first supply voltage rail;
      the second trigger source and the first ESD source are directly connected to a second supply voltage rail;
      the first ESD gate is directly connected to the first trigger gate; and
      the first trigger drain is directly connected to the second trigger gate and the second ESD gate.

2. The ESD control circuit of claim 1, wherein:
   the second ESD drain is directly connected to the second supply voltage rail; and
   the second ESD source is directly connected to the first supply voltage rail.

3. The ESD control circuit of claim 1, wherein a first trigger body of the first trigger transistor is directly connected to the first supply voltage rail.

4. The ESD control circuit of claim 1, wherein a first ESD body of the first ESD transistor is directly connected to the second supply voltage rail.

5. The ESD control circuit of claim 1, comprising a first feedback transistor comprising a first feedback gate, a first feedback source, and a first feedback drain, wherein:
   the first feedback gate is directly connected to the first trigger drain and the second trigger gate;
   the first feedback drain is directly connected to the first trigger gate, the first ESD gate, and the second trigger drain; and
   the first feedback source is directly connected to the first supply voltage rail.

6. The ESD control circuit of claim 5, wherein a first feedback body of the first feedback transistor is directly connected to the first supply voltage rail.

7. The ESD control circuit of claim 1, comprising a second feedback transistor comprising a second feedback gate, a second feedback source, and a second feedback drain, wherein:
the second feedback gate is directly connected to the second trigger drain, the first ESD gate, and the first trigger gate;
the second feedback drain is directly connected to the second trigger gate, the second ESD gate, and the first trigger drain; and
the second feedback source is directly connected to the second supply voltage rail.

8. The ESD control circuit of claim 7, wherein a second feedback body of the second feedback transistor is directly connected to the second supply voltage rail.

9. The ESD control circuit of claim 1, comprising a clamp circuit directly connected to the second supply voltage rail and the second ESD gate.

10. The ESD control circuit of claim 9, wherein the clamp circuit comprises one or more diodes.

11. The ESD control circuit of claim 1, comprising a shut off circuit directly connected to the second supply voltage rail and the first ESD gate and configured to settle a voltage at the first ESD gate.

12. The ESD control circuit of claim 11, wherein the shut off circuit comprises a resistive device.

13. The ESD control circuit of claim 1, wherein the first ESD gate is directly connected to the second trigger drain.

14. An electrostatic discharge (ESD) control circuit, comprising:
a first trigger transistor comprising a first trigger gate, a first trigger source, and a first trigger drain;
a second trigger transistor comprising a second trigger gate, a second trigger source, and a second trigger drain;
a first feedback transistor comprising a first feedback gate, a first feedback source, and a first feedback drain;
a second feedback transistor comprising a second feedback gate, a second feedback source, and a second feedback drain;
a first electrostatic discharge (ESD) transistor comprising a first ESD gate, a first ESD source, and a first ESD drain; and
a second ESD transistor comprising a second ESD gate, a second ESD source, and a second ESD drain, wherein:
the first ESD gate is directly connected to the first trigger gate, the first feedback drain, the second trigger drain, and the second feedback gate; and
the second ESD gate is directly connected to the first trigger drain, the first feedback gate, the second trigger gate, and the second feedback drain.

15. The ESD control circuit of claim 14, wherein:
the first trigger source, the first feedback source, the second ESD source, and the first ESD drain are directly connected to a first supply voltage rail; and
the second trigger source, the second feedback source, the second ESD drain, and the first ESD source are directly connected to a second supply voltage rail.

16. The ESD control circuit of claim 15, comprising a clamp circuit directly connected to the second supply voltage rail and the second ESD gate.

17. The ESD control circuit of claim 16, wherein the clamp circuit comprises one or more diodes.

18. The ESD control circuit of claim 15, comprising a shut off circuit directly connected to the second supply voltage rail and the first ESD gate and configured to settle a voltage at the first ESD gate.

19. The ESD control circuit of claim 18, wherein the shut off circuit comprises a resistive device.

20. An electrostatic discharge (ESD) control circuit, comprising:
a clamp circuit comprising a string of diodes;
a first trigger transistor comprising a first trigger gate, a first trigger source, and a first trigger drain;
a second trigger transistor comprising a second trigger gate, a second trigger source, and a second trigger drain;
a first feedback transistor comprising a first feedback gate, a first feedback source, and a first feedback drain;
a second feedback transistor comprising a second feedback gate, a second feedback source, and a second feedback drain;
a first electrostatic discharge (ESD) transistor comprising a first ESD gate, a first ESD source, and a first ESD drain; and
a second ESD transistor comprising a second ESD gate, a second ESD source, and a second ESD drain, wherein:
the first ESD gate is directly connected to the first trigger gate, the first feedback drain, the second trigger drain, and the second feedback gate; and
the second ESD gate is directly connected to the first trigger drain, the first feedback gate, the second trigger gate, the second feedback drain, and the string of diodes.

* * * * *